(No Model.)
C. A. SVENSSON.
BEARING.
No. 580,994.
Patented Apr. 20, 1897.
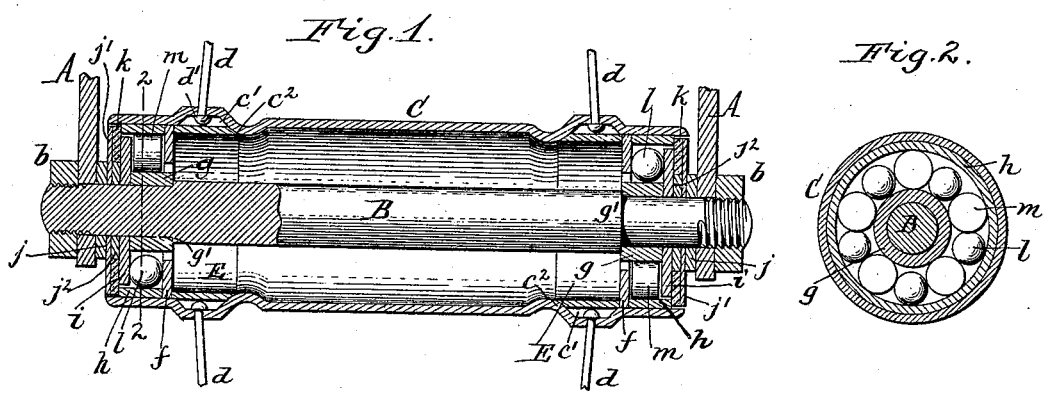
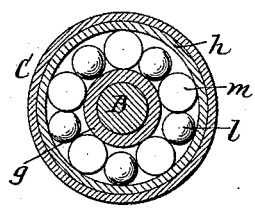
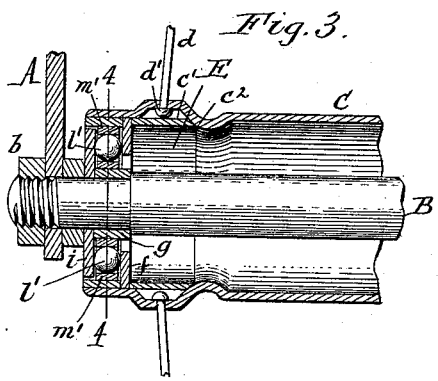
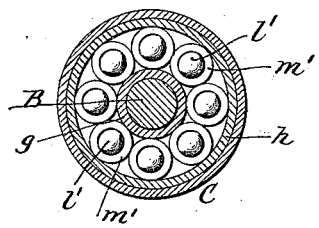
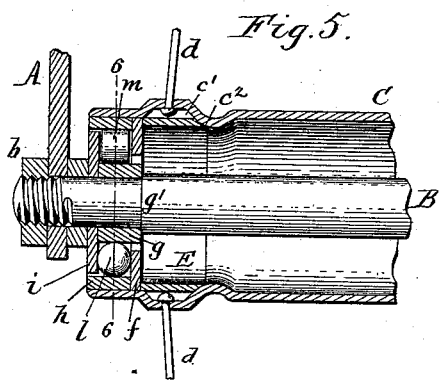
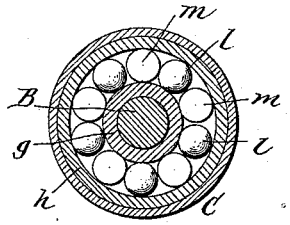
Witnesses:
Ernest Pulsford.
Theo. L. Popp.
C. A. Svensson Inventor.
By Wilhelm Bonner
Attorneys.
THE NORRIS PETERS CO., PHOTO-LITHO., WASHINGTON, D. C.

UNITED STATES PATENT OFFICE.

CLAES A. SVENSSON, OF BUFFALO, NEW YORK.

BEARING.

SPECIFICATION forming part of Letters Patent No. 580,994, dated April 20, 1897.

Application filed July 17, 1896. Serial No. 599,516. (No model.)

*To all whom it may concern:*

Be it known that I, CLAES A. SVENSSON, a citizen of the United States, residing at Buffalo, in the county of Erie and State of New York, have invented a new and useful Improvement in Bearings, of which the following is a specification.

This invention relates to that class of antifriction journal-bearings having rollers which receive the radial or downward thrust and balls which receive the end thrust.

My invention has for its objects to simplify and cheapen the construction of such bearings, to minimize the friction of the parts, and to reduce the bearing to a compass which renders it applicable to the journals of bicycles or other velocipedes without unduly diminishing the size of the antifriction balls and rollers.

In the accompanying drawings, Figure 1 is a sectional elevation of a wheel hub and journal provided with my improved bearing. Fig. 2 is a cross-section thereof in line 2 2, Fig. 1. Fig. 3 is a fragmentary sectional elevation of a wheel hub and journal, showing a modified construction of the bearing. Fig. 4 is a cross-section in line 4 4, Fig. 3. Fig. 5 is a view similar to Fig. 3, showing another modification of the bearing. Fig. 6 is a cross-section in line 6 6, Fig. 5.

Like letters of reference refer to like parts in the several figures.

Referring to the preferred construction of the bearing shown in Figs. 1 and 2, A represents the usual fork-arms of a velocipede; B, the stationary axle or journal secured at its ends in openings or slots in the fork-arms by the customary clamping-nuts $b$; C, the barrel forming the wheel-hub, and $d$ the spokes. The hub is preferably provided near its ends with hollow annular enlargements forming grooves $c'$, which receive the heads $d'$ of the spokes, and on the inner side of each of these grooves with an internal bead forming an annular shoulder $c^2$.

E represents dust-rings or annular shields arranged within the hub and closing the open inner sides of the grooves $c'$, so as to exclude from the interior of the hub any dust which may pass through the spoke-holes. These dust rings or shields bear at their inner edges against the annular shoulders $c^2$ of the hub.

The hub is supported upon the axle B by bearings arranged at the ends thereof. These bearings are identical in construction, and a description of one will therefore suffice for both.

$f$ is an inner bearing disk or washer arranged in the cylindrical end portion of the wheel-hub and abutting against the outer end of the dust-ring E.

$g$ is an inner bearing collar or thimble surrounding the axle B and bearing at its inner edge against a shoulder $g'$ of the axle. This bearing-collar extends outwardly beyond the inner bearing-disk $f$, and the latter is provided with a central opening which is large enough to allow said disk to clear the collar, as shown in Fig. 1.

$h$ is an outer bearing-collar arranged in the end portion of the wheel-hub concentrically with the inner bearing-collar $g$ and separated from the latter by an intervening annular space or channel.

$i$ is an outer bearing-disk surrounding the axle B and bearing against the outer end of the inner bearing collar or thimble $g$.

$j, j'$, and $j^2$ represent washers interposed between the outer bearing-disk $i$ and the inner side of the adjacent fork-arm A, and $k$ is a washer or packing of felt or other suitable material clamped between the outer bearing-disk and the central washer $j'$ and covering the joint between the edge of said outer disk and the opposing outer bearing ring or collar $h$. For this purpose the central washer $j'$ is made of larger diameter than the inner washer $j^2$, which is surrounded by the felt washer, so as to overlap the latter, as shown in Fig. 1.

The inner and outer bearing-disks $f$ $i$ and the inner and outer bearing-collars $g$ $h$ together form an annular race or channel which receives the antifriction-balls $l$ and rollers $m$ of the bearing. The rollers $m$ are cylindrical, and their diameter is equal to the distance between the inner and outer bearing-collars $g$ $h$, so that they run in contact with both of said collars, and thus receive the radial or downward thrust of the bearing. The rollers are somewhat shorter than the width of the race or channel in which they travel, as shown in the drawings, so that their ends clear the bearing-disks $f$ and $i$. The antifriction-balls $l$ are made of such a diameter that they bear against both the inner and outer disks $f$ and $i$, as shown in Fig. 1. In other words, their diameter exceeds the length of the rollers $m$, so that they extend laterally beyond the ends of the rollers and run in contact with the bearing-disks $f$ and $i$, so as to receive the end thrust of the bearing, and thereby relieve the rollers from such end thrust. The balls, while larger in diameter than the length of the rollers, are preferably smaller in diameter than the diameter of the rollers or the distance between the inner and outer bearing-collars $g$ and $h$, as shown, so that they receive no radial thrust, but only end thrust, thus reducing the friction to a minimum.

The balls and rollers of the bearing are preferably arranged alternately, as shown in Figs. 1 and 2. By thus arranging a ball between every two rollers and making the balls of smaller diameter than that of the rollers the balls are not turned in the same direction as the rollers, which would be the case if they touched the outer bearing-roller $h$ when on the upper side of the bearing, but they are free to turn in the opposite direction by contact with the rollers, as indicated by the arrows in Fig. 2. The balls do not, therefore, grind against the inner and outer bearing-collars $g$ and $h$, but simply bear at diametrically opposite points against the inner and outer bearing-disks $f$ and $i$, thus materially reducing friction. If desired, the balls may be made of the same diameter as that of the rollers, as shown in Figs. 5 and 6, but by this construction the last-described advantage is not obtained.

In the modified construction of the bearing shown in Figs. 3 and 4 the rollers $m'$ are hollow, and the balls $l'$ are arranged within the hollow rollers instead of being arranged alternately therewith. In this case the diameter of the balls is greater than the length of the rollers, as in the constructions previously described, so that the balls project beyond the ends of the rollers and receive the end thrust, thus subjecting the rollers to radial thrust only.

My improved bearing is very simple in construction and can be produced at small cost, as the rollers can be cut from steel rods or tubing, while the bearing-surfaces consist simply of rings and washers. As the rollers are comparatively short, they require no spindle or axles, thus dispensing also with the supporting-rings heretofore employed for such spindles, simplifying the bearing correspondingly and enabling it to be made of the requisite small size to render it suitable for bicycles and other velocipedes, while at the same time avoiding the use of very small balls, which can be made truly spherical only with difficulty and which rapidly wear out the bearing.

I claim as my invention—

1. The combination with a journal and a wheel-hub or surrounding case separated from the journal by an intervening annular race or channel, of rollers arranged in said channel and made shorter than the width of said channel, whereby the rollers receive only the radial thrust of the bearing, and balls also arranged in said channel and having a larger diameter than the length of said rollers, whereby the balls extend beyond the ends of the rollers and receive the end thrust of the bearing, substantially as set forth.

2. The combination with a journal and a wheel-hub or surrounding case separated from the journal by an intervening annular race or channel, of rollers arranged in said channel and made shorter than the width of said channel, and balls arranged to alternate with said rollers and having a larger diameter than the length of said rollers, whereby the balls extend beyond the ends of the rollers, substantially as set forth.

3. The combination with a journal and a wheel-hub or surrounding case separated from the journal by an intervening annular race or channel, of rollers arranged in said channel and made shorter than the width of said channel, and of a diameter corresponding to the depth of the channel, and balls also arranged in said channel and having a diameter exceeding the length of said rollers, but less than the diameter of the rollers, substantially as set forth.

4. The combination with a journal or axle and a wheel-hub having at a distance from its end a hollow annular enlargement, forming an internal groove adapted to receive the heads of the spokes, and provided on the inner side of said groove with a bead or shoulder projecting inwardly beyond the inner surface of the hub, a journal-bearing arranged in the end of the hub, and a ring or shield interposed between said internal bead or shoulder and said journal-bearing and covering the open side of said spoke-groove, substantially as set forth.

5. The combination with a journal or axle and a wheel-hub having near its end a hollow annular enlargement forming an internal groove adapted to receive the heads of the spokes and provided on the inner side of said enlargement with a shoulder, of a dust ring or shield closing the open inner side of said spoke-groove and bearing against the shoulder of the hub, an inner bearing-disk arranged in the cylindrical end portion of the hub and abutting against said dust-shield, an inner bearing collar or thimble surrounding the axle or journal, an outer bearing-collar arranged in the end portion of the hub opposite said inner collar and separated therefrom by an intervening race or channel, an outer bearing-disk surrounding the axle or journal and abutting against said inner bearing-collar, and antifriction balls and rollers arranged in said race or channel, substantially as set forth.

Witness my hand this 15th day of July, 1896.

C. A. SVENSSON.

Witnesses:
 JNO. J. BONNER,
 ELLA R. DEAN.